US012810595B2

(12) United States Patent
Ulasen et al.

(10) Patent No.: US 12,810,595 B2
(45) Date of Patent: Nov. 24, 2026

(54) SYSTEMS AND METHODS FOR VEHICLE IDENTIFICATION IN IMAGES

(71) Applicants: Constructor Technology AG, Schaffhausen (CH); Constructor Education and Research Genossenschaft, Schaffhausen (CH)

(72) Inventors: Sergey Ulasen, Singapore (SG); Andrei Boiarov, Sofia (BG); Dmitry Bleklov, Sofia (BG); Pavlo Bredikhin, Kharkov (UA); Serg Bell, Singapore (SG); Stanislav Protasov, Singapore (SG); Nikolay Dobrovolskiy, Alanya (TR); Laurent Dedenis, Singapore (SG)

(73) Assignee: Constructor Technology AG, Schaffhausen (CH)

( * ) Notice: Subject to any disclaimer, the term of this patent is extended or adjusted under 35 U.S.C. 154(b) by 225 days.

(21) Appl. No.: 18/929,700

(22) Filed: Oct. 29, 2024

(65) Prior Publication Data

US 2026/0120440 A1 Apr. 30, 2026

(51) Int. Cl.
*G06V 10/82* (2022.01)
*G06F 9/451* (2018.01)
*G06V 10/774* (2022.01)

(52) U.S. Cl.
CPC .......... *G06V 10/7747* (2022.01); *G06F 9/451* (2018.02); *G06V 2201/08* (2022.01)

(58) Field of Classification Search
CPC ........... G06V 10/7747; G06V 2201/08; G06V 10/774; G06V 10/82; G06F 9/451
See application file for complete search history.

(56) References Cited

U.S. PATENT DOCUMENTS

2017/0293894 A1* 10/2017 Taliwal .................. G06V 10/82
2020/0090321 A1* 3/2020 Xu ............................ G06T 7/70
2021/0201337 A1* 7/2021 Chow ................ G06Q 30/0203
2022/0101508 A1* 3/2022 Tang .......................... G06T 7/11
2022/0374657 A1* 11/2022 Pandey ................ G05D 1/0088
2023/0142507 A1* 5/2023 Yao ........................ G06Q 40/08 382/103

(Continued)

OTHER PUBLICATIONS

He et al., "Masked Autoencoders Are Scalable Vision Learners", Computer Vision and Pattern Recognition, Available on internet at: https://arxiv.org/pdf/2111.06377v2, 2021, 14 pages.

(Continued)

*Primary Examiner* — Syed Haider
(74) *Attorney, Agent, or Firm* — ArentFox Schiff LLP; Michael Fainberg

(57) ABSTRACT

A system generates a first dataset with input images of vehicles and corresponding output vectors identifying the vehicles. The system also creates a second dataset with images of damaged vehicles and output vectors detailing the damages. The system trains a machine learning model using the first dataset to detect vehicles in images, employing backbone and linear layers. The system then fine-tunes the model with the second dataset to identify damages on detected vehicles, updating the weights of the backbone layers during initial training and the first linear layer during fine-tuning. The system processes an input image of a vehicle through the trained model to detect and display any damages on a user interface, highlighting the vehicle and its damages.

19 Claims, 8 Drawing Sheets

(56) References Cited

U.S. PATENT DOCUMENTS

| | | | | |
|---|---|---|---|---|
| 2023/0177616 A1* | 6/2023 | Thurber | ............... | G06Q 50/163<br>705/4 |

OTHER PUBLICATIONS

Mizrahi et al., "4M: Massively Multimodal Masked Modeling", Computer Vision and Pattern Recognition, Available on internet at: https://arxiv.org/pdf/2312.06647, 2023, 46 pages.

* cited by examiner

400

500

700

SYSTEMS AND METHODS FOR VEHICLE IDENTIFICATION IN IMAGES

FIELD OF TECHNOLOGY

The present disclosure relates to the field of computer vision and machine learning, and, more specifically, to systems and methods for generating information pertaining to vehicles in an environment.

BACKGROUND

Vehicular races heavily rely on cameras for identification purposes, utilizing high-speed and high-resolution cameras to capture detailed images and videos of the vehicles as they speed around the track. These cameras are strategically placed at various points along the race course to ensure comprehensive coverage, enabling race officials to monitor the race, identify vehicles, and verify race results. The footage is also used for instant replays, analyzing incidents, and providing live broadcasts to audiences. However, despite the advanced technology, there is a need for improvement in car identification and description. The rapid movement of cars, varying lighting conditions, and potential obstructions can sometimes lead to inaccuracies or delays in identifying vehicles.

Similarly, these shortcomings apply in other settings such as busy traffic areas. There may be traffic cameras and/or security cameras capturing images of vehicles navigating in a city/town. These images are later used for determining whether drivers have broken laws (e.g., speeding, red light violations, etc.). However, there is a need for improvement in car identification and description.

SUMMARY

Aspects of the present disclosure address the previously described shortcomings by presenting systems and methods for extracting, using machine learning, information about vehicles detected in an image and generating a user interface that enables a user to access the extracted information cohesively.

In one exemplary aspect, the techniques described herein relate to a method for extracting information about vehicles detected in an image, the method including: creating a first dataset including both a first plurality of input images depicting vehicles in an environment, and a first plurality of output vectors including information identifying the vehicles; creating a second dataset including a second plurality of input images depicting damaged vehicles, and a second plurality of output vectors including information about damages on the damaged vehicles; training, using the first dataset, a machine learning model including a plurality of backbone layers and a plurality of linear layers to detect any vehicle present in an input image; fine-tuning, using the second dataset, the machine learning model to further identify any damage on a detected vehicle, wherein training using the first dataset involves updating weights of the plurality of backbone layers and fine-tuning using the second dataset involves updating weights of a first linear layer of the plurality of linear layers; executing the machine learning model on an input image depicting a first vehicle to receive an inference from the machine learning model; and generating, for display on a user interface, the input image processed by the machine learning model, wherein the user interface depicts a portion of the input image including the first vehicle and any damage detected on the first vehicle.

In some aspects, the techniques described herein relate to a method, further including: creating a third dataset including a third plurality of input images depicting vehicles at various angles, and a third plurality of output vectors indicating specific orientations of the vehicles at various angles; and fine-tuning, using the third dataset, the machine learning model to further identify an orientation on a detected vehicle, wherein fine-tuning using the third dataset involves updating weights of a second linear layer of the plurality of linear layers.

In some aspects, the techniques described herein relate to a method, wherein the user interface further indicates a determined orientation of the first vehicle in the input image.

In some aspects, the techniques described herein relate to a method, further including: receiving, via the user interface, a user request to view any images that meet one or more criteria including: a specific type of vehicle, a vehicle with a particular type of damage, vehicles in a specific orientation; and selecting, from a plurality of processed images, a subset of images that meet the one or more criteria.

In some aspects, the techniques described herein relate to a method, wherein the information included in the first plurality of output vectors further indicates an amount of vehicles in the environment, an order of vehicles, and descriptions of vehicle movement.

In some aspects, the techniques described herein relate to a method, wherein the information included in the first plurality of output vectors further indicates a segmentation map that differentiates zones in the environment where a given vehicle is authorized to move.

In some aspects, the techniques described herein relate to a method, wherein the information in the first plurality of output vectors further indicates a livery description that lists visual attributes of a given vehicle.

In some aspects, the techniques described herein relate to a method, wherein the first dataset is a generalized dataset compared to the second dataset.

In some aspects, the techniques described herein relate to a method, further including: training, using the first dataset and the second dataset, a large language model to answer user queries received via the user interface, wherein the user queries request portions of information in the first dataset and the second dataset; receiving a user query; executing the large language model on the user query; and outputting, on the user interface, a response to the user query generated by the large language model.

It should be noted that the methods described above may be implemented in a system comprising a hardware processor. Alternatively, the methods may be implemented using computer executable instructions of a non-transitory computer readable medium.

In some aspects, the techniques described herein relate to a system for extracting information about vehicles detected in an image, including: at least one memory; at least one hardware processor coupled with the at least one memory and configured, individually or in combination, to: create a first dataset including both a first plurality of input images depicting vehicles in an environment, and a first plurality of output vectors including information identifying the vehicles; create a second dataset including a second plurality of input images depicting damaged vehicles, and a second plurality of output vectors including information about damages on the damaged vehicles; train, using the first dataset, a machine learning model including a plurality of backbone layers and a plurality of linear layers to detect any vehicle present in an input image; fine-tune, using the second dataset, the machine learning model to further identify any damage on a detected vehicle, wherein training using the first dataset involves updating weights of the plurality of backbone layers and fine-tuning using the second dataset involves updating weights of a first linear layer of the plurality of linear layers; execute the machine learning model on an input image depicting a first vehicle to receive an inference from the machine learning model; and generate, for display on a user interface, the input image processed by the machine learning model, wherein the user interface depicts a portion of the input image including the first vehicle and any damage detected on the first vehicle.

In some aspects, the techniques described herein relate to a non-transitory computer readable medium storing thereon computer executable instructions for extracting information about vehicles detected in an image, including instructions for: creating a first dataset including both a first plurality of input images depicting vehicles in an environment, and a first plurality of output vectors including information identifying the vehicles; creating a second dataset including a second plurality of input images depicting damaged vehicles, and a second plurality of output vectors including information about damages on the damaged vehicles; training, using the first dataset, a machine learning model including a plurality of backbone layers and a plurality of linear layers to detect any vehicle present in an input image; fine-tuning, using the second dataset, the machine learning model to further identify any damage on a detected vehicle, wherein training using the first dataset involves updating weights of the plurality of backbone layers and fine-tuning using the second dataset involves updating weights of a first linear layer of the plurality of linear layers; executing the machine learning model on an input image depicting a first vehicle to receive an inference from the machine learning model; and generating, for display on a user interface, the input image processed by the machine learning model, wherein the user interface depicts a portion of the input image including the first vehicle and any damage detected on the first vehicle.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for extracting information about vehicles detected in an image and generating a user interface presenting extracted information pertaining to the vehicles. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
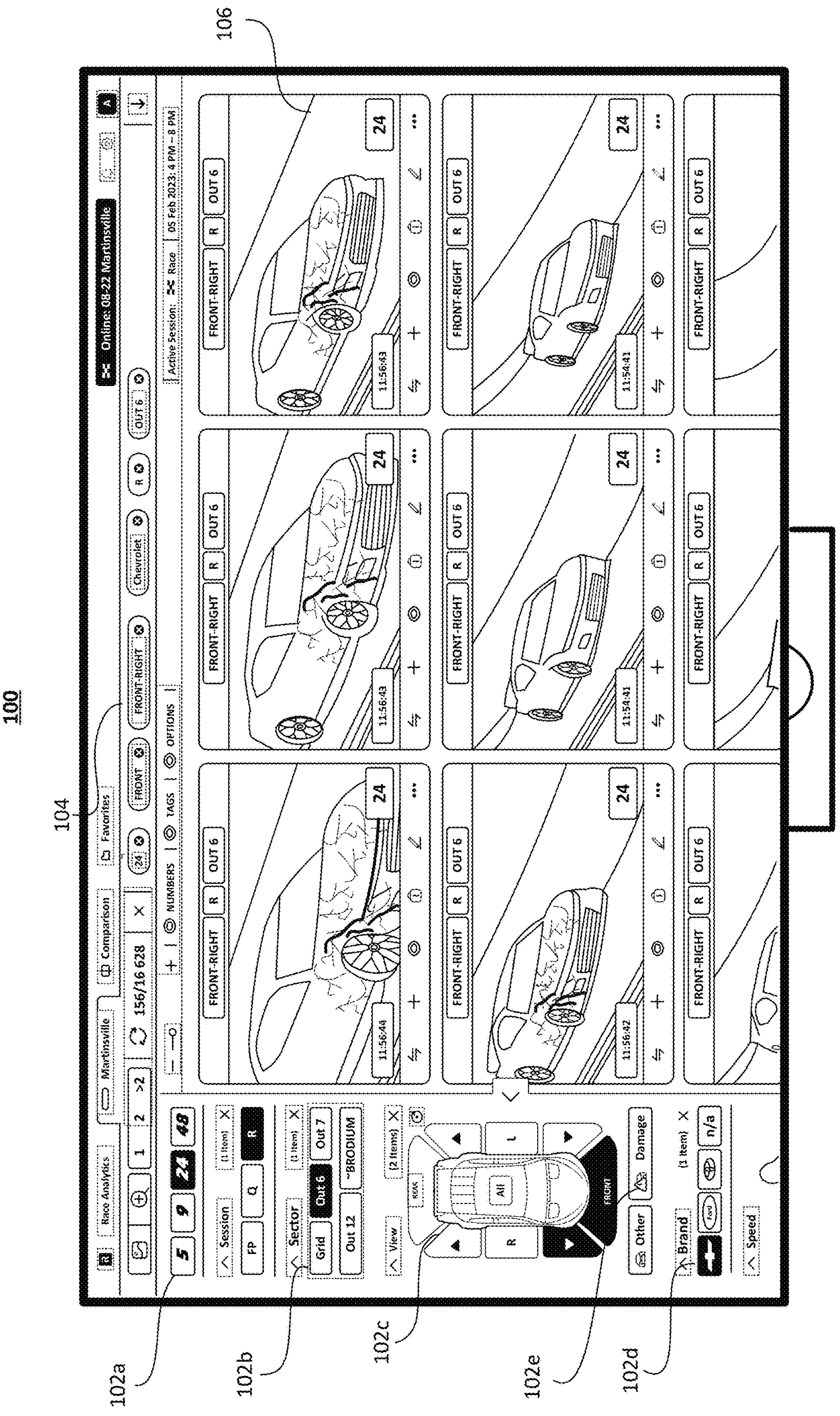
FIG. 1 is a diagram of a user interface that presents information pertaining to vehicles in an environment.

FIG. 1 is a diagram of a user interface 100 that presents information pertaining to vehicles in an environment. User interface may be generated by vehicle module 101. Consider an example in which user interface 100 presents information about race cars. There are a plurality of filtering options 102 provided in user interface 100.

For example, option 102*a* enables the user to search for a specific car number (e.g., inscribed on the livery of the vehicle). In FIG. 1, there are four car numbers to select from (e.g., 5, 9, 24, and 48). The user may select car number 24. Option 102*b* enables a user to select a particular sector of the race track that the images of the car should be positioned in. Option 102*c* enables a user to select the angle from which the images should depict the car. For example, the front and front-right views are selected in FIG. 1. Option 102*d* enables a user to select the brand of the vehicle. For example, "Chevrolet" is selected by the user. The filtering selections made by the user are listed in toolbar 104. In some aspects, the user can remove certain selections from toolbar 104 (e.g., remove the car number filter). Option 102*e* enables a user to select images in which damage is visible on the vehicle.

Based on the filtering selections made, results 106 are generated on user interface 100. Results 106 include a plurality of images that match the filtering options selected by the user (e.g., front-right perspective images of a Chevrolet car marked 24 in the Out 6 part of the track). As shown in results 106, the first four images show a damaged car, where the car is present on the front right portion of the car (over the bumper, hood, and headlight).

It should be noted that only four options are highlighted in FIG. 1 for simplicity. There are several other filtering options that a user can access using user interface 100 and such options will be discussed in reference to subsequent figures of the present disclosure. For example, the user may filter based on vehicle speed (e.g., show images in which the vehicle is traveling more than 60 miles per hour), race (e.g., show images from a specific race), car color, etc.

Figure 2:
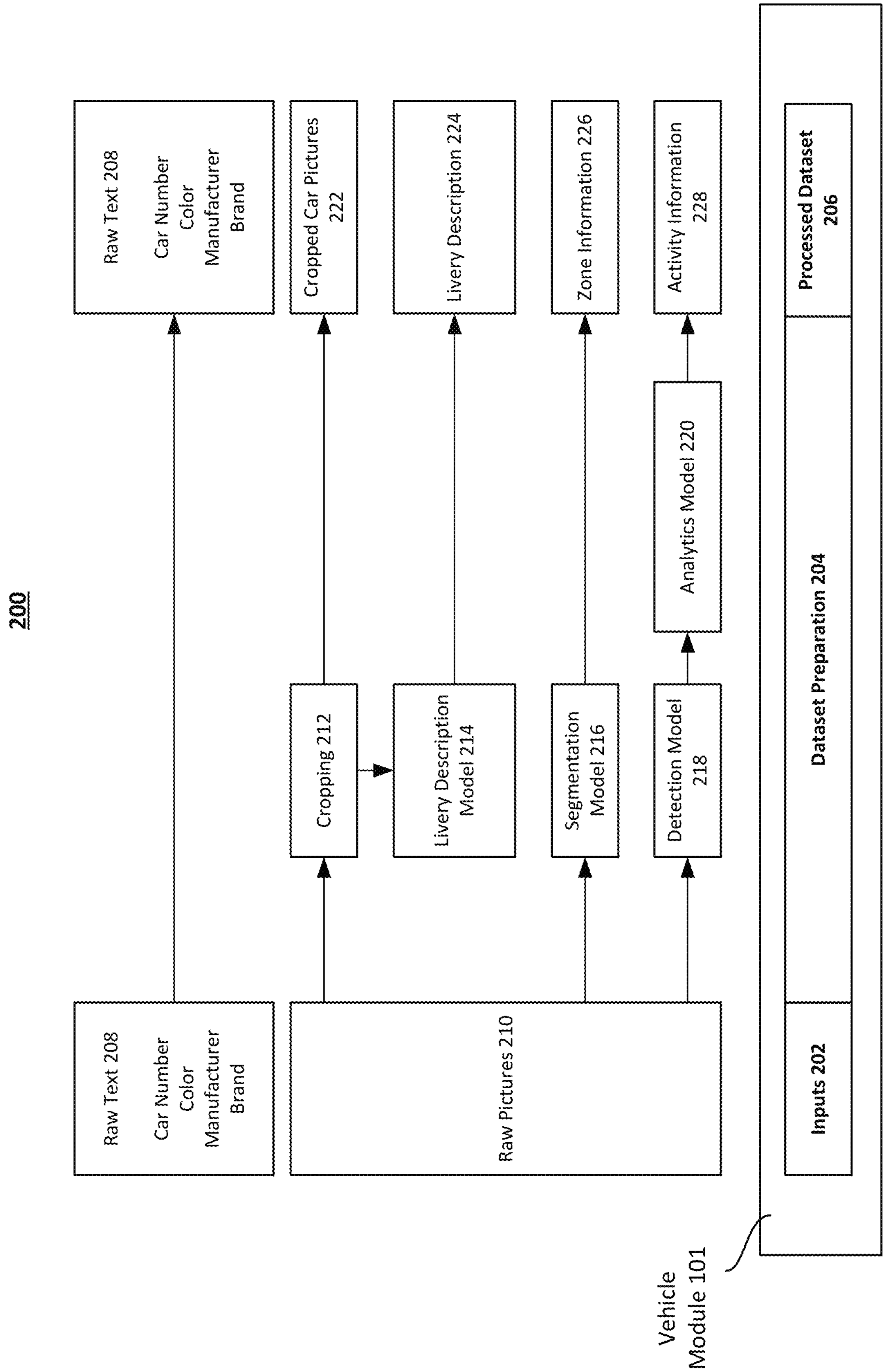
FIG. 2 is a block diagram illustrating the preparation of a dataset for vehicle information generation.

FIG. 2 is a block diagram 200 illustrating the preparation of a dataset for vehicle information generation. In block diagram 200, inputs 202 are provided. Inputs 202 undergo dataset preparation 204 (comprising multiple machine learning models), which results in the generation of processed dataset 206. Inputs 202, dataset preparation 204, and processed dataset 206 may all be components of vehicle module 101.

Inputs 202 include raw text 208, which may indicate a plurality of attributes such as car number, color, manufacturer, car brand, etc. Inputs 202 further include a plurality of raw pictures 210 that accompany raw text 208. For example, an input raw picture may depict a vehicle and an input raw text may describe the number, color, manufacturer, brand, etc., associated with said vehicle.

During dataset preparation 204, raw pictures 210 undergo a variety of processing machine learning models. Cropping 212 involves cropping a given image to solely depict a vehicle (e.g., remove objects in the vicinity). This results in cropped car pictures 222. In some aspects, cropping 212 is performed by a machine learning model configured to detect vehicles and crop images to match dimensions of the boundary boxes bounding the vehicles.

Cropped car pictures 222 are provided to a livery description model 214, which is trained to generate livery description 224 (e.g., text-based color schemes and other visual attributes of the vehicle such as a logo).

Raw pictures 210 are also input into segmentation model 216, which generates zone information 226. Zone information 226 delineates the car and road and marks them accordingly in each input image.

Raw pictures 210 is further input into detection model 218 and analytics model 220, which ultimately generates activity information 228. Activity information 228 is a text description for actions (e.g., how many cars are in an image, what is happening, what is the order of cars, etc.).

In some aspects, each of cropping 212, livery description model 214, segmentation model 216, detection model 218, and analytics model 220 may be pre-trained to perform specific tasks such as cropping an image and providing a livery description, zone information, and/or activity information for a given input image. Processed dataset 206 may thus include labelled information for a plurality of images.

Figure 3:
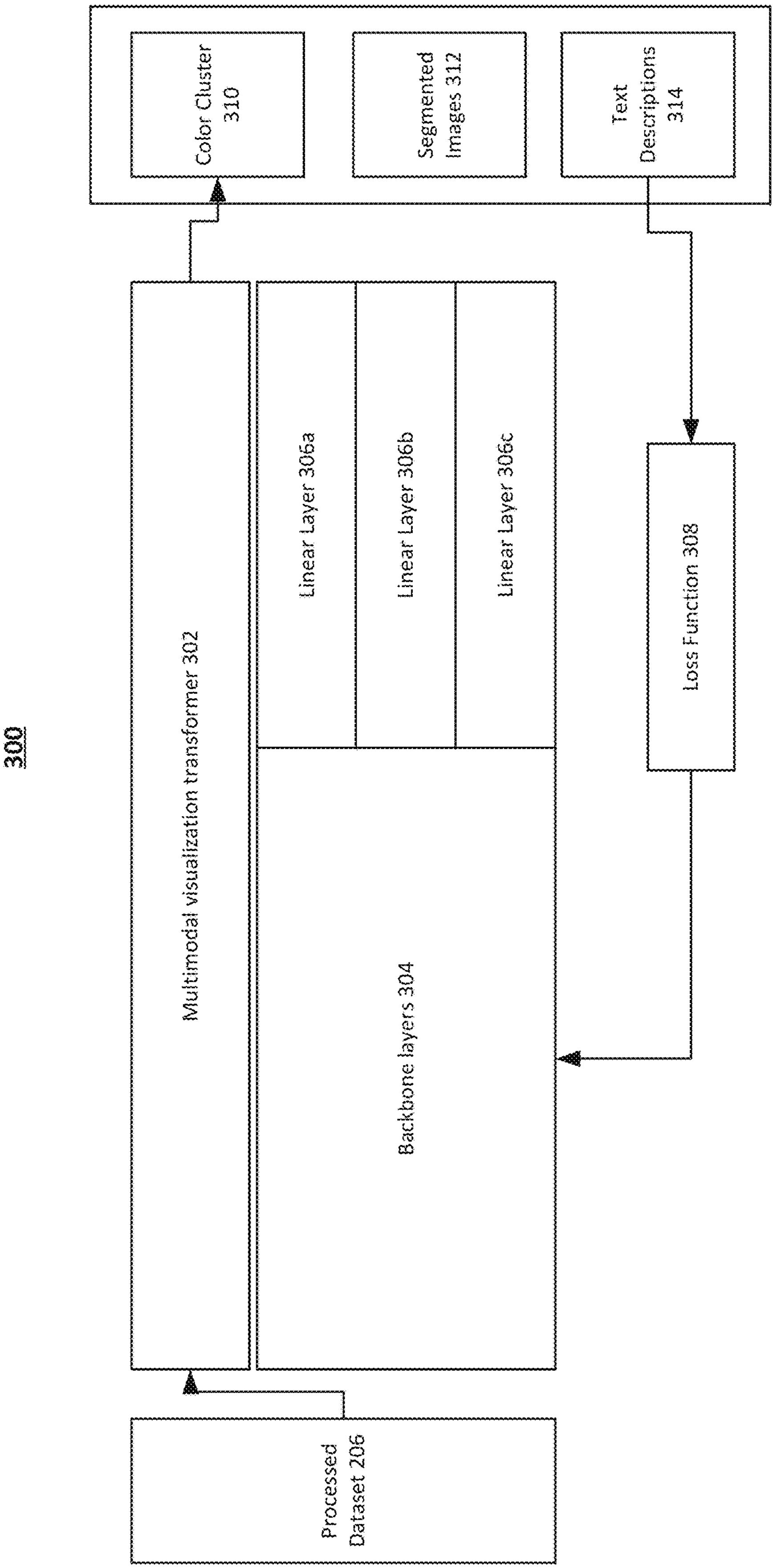
FIG. 3 is a block diagram illustrating the training of backbone layers in a visualization transformer.

FIG. 3 is a block diagram 300 illustrating the training of backbone layers in a visualization transformer. Multimodal visualization transformer 302 may be a part of vehicle module 101. As shown in FIG. 3, multimodal visualization transformer 302 may be configured to generate a plurality of outputs such as color cluster 310, segmented images 312, and text descriptions 314. Transformer 302 may be made up of backbone layers 304 and linear layers 306*a*, 306*b*, and 306*c*. In this case, color cluster 310 is one portion of livery description 224 (e.g., identifying the dominant colors and patterns on a vehicle's exterior), segmented images 312 correspond to zone information 226 (e.g., highlighting different zones on a race track where vehicles are allowed to move), and text descriptions 314 correspond to activity information 228 (e.g., providing textual descriptions of vehicle movements such as "Car 24 overtaking Car 12 on the left").

Using processed dataset 206, transformer 302 is trained to perform all the functionality of cropping 212 (e.g., isolating the vehicle from the background in an image), livery description model 214 (e.g., identifying and describing the visual design and colors of a vehicle), segmentation model 216 (e.g., dividing an image into different segments such as the vehicle, road, and background), detection model 218 (e.g., identifying the presence and position of vehicles in an image), and analytics model 220 (e.g., analyzing vehicle movements and interactions). In diagram 300, the output of transformer 302 is compared against the target values in processed dataset 206. For example, if the position of the road and vehicle as highlighted in segmented images 312 does not match the target zone information in the processed dataset 206, a loss function 308 generates a non-zero loss value. The loss value is used to update the weights of backbone layers 304 (e.g., convolutional layers responsible for feature extraction). It should be noted that the weights of linear layers 306*a*, 306*b*, and 306*c* are not updated (e.g., the fully connected layers responsible for interpreting the extracted features remain unchanged during this training phase). This approach ensures that the backbone layers improve their ability to extract relevant features from the images, while the linear layers maintain their initial configurations for specific tasks.

In the context of the multimodal visualization transformer 302, the specific choice of loss function 308 would depend on the nature of the outputs being generated (e.g., color clusters, segmented images, text descriptions) and the specific tasks being performed (e.g., regression, classification, segmentation). The loss function helps ensure that the model's predictions align closely with the target values in the processed dataset 206, thereby improving the model's accuracy and performance over time. Loss function 308 may include one or more of: Mean Squared Error (MSE) for regression tasks, Cross-Entropy Loss for classification, and Dice Loss for image segmentation.

Figure 4:
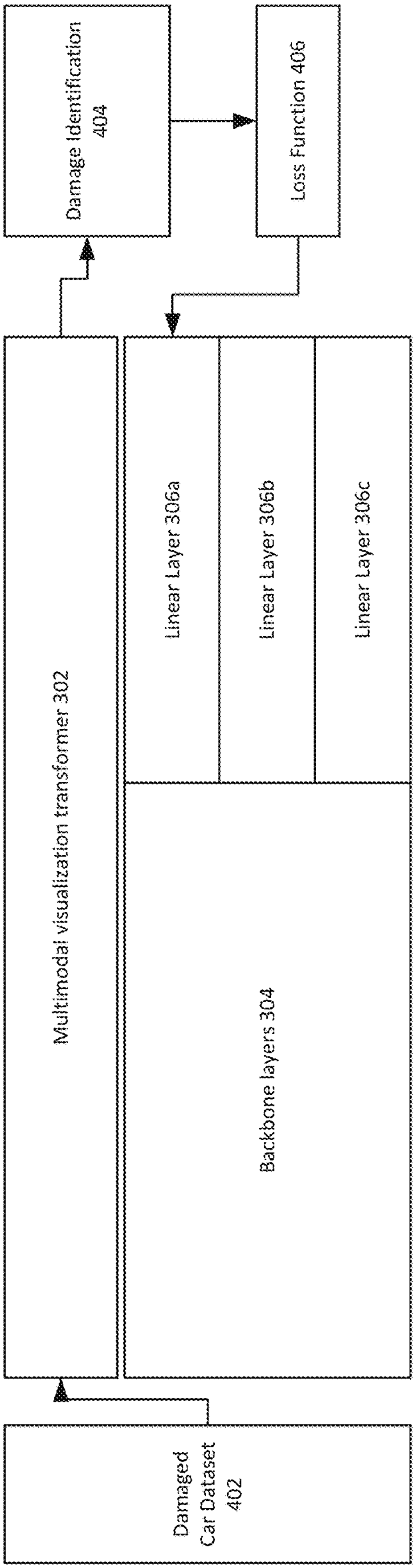
FIG. 4 is a block diagram illustrating the training of linear layers that identify vehicle damage in the visualization transformer.

FIG. 4 is a block diagram 400 illustrating the training of linear layers that identify vehicle damage in the visualization transformer. In diagram 400, damaged car dataset 402 is introduced. This dataset may include images of damaged vehicles. Each image is accompanied by a label that indicates the type of damage (e.g., cosmetic only, performance-affecting, etc.), an amount of damage (e.g., significant, minor, etc.), and a location of the damage on the vehicle (e.g., on the headlight, windshield, bumper, hood, etc.).

Subsequent to training backbone layers 304, the linear layer(s) of transformer 302 are trained to output damage identification 404. In some aspects, damage identification 404 may simply indicate whether damage exists on a vehicle in an input image. In some aspects, damage identification 404 may further indicate one or more of: the type of damage, an amount of damage, and a location of the damage on the vehicle. During training of linear layers, such as linear layer 306*a*, the weights of the backbone layers 304 are frozen. More specifically, loss function 406 calculates a loss between damage identification 404 and the target damage identification in damaged car dataset 402 for a particular input. In some aspects, this loss is used to updated the weights of linear layer 306*a*, but no other layer.

Figure 5:
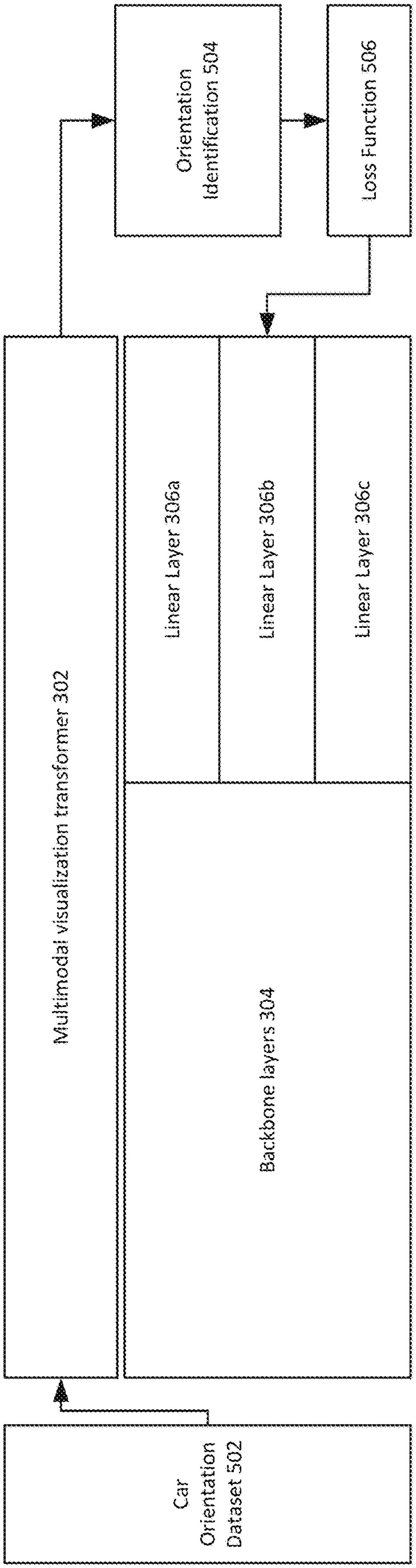
FIG. 5 is a block diagram illustrating the training of linear layers that identify vehicle orientation in the visualization transformer.

FIG. 5 is a block diagram 500 illustrating the training of linear layers that identify vehicle orientation in the visualization transformer. In diagram 500, car orientation dataset 502 is introduced. This dataset may include images of vehicles in different orientations. Each image is accompanied by a label that indicates a quantitative or qualitative expression of orientation. For example, a quantitative value may be an angle where 0 degrees represents a front view, 90 and −90 degrees represents side views and 180 degrees represents a back view. Angles in between represent specific angular views. A qualitative value may be "front," "front-right," "right side," etc., where each of these labels may be represented by a range of angles. For example, −20 degrees to 20 degrees may classify as a "front" orientation.

Subsequent to training backbone layers 304, the linear layer(s) of transformer 302 are trained to output orientation identification 504. During training of linear layers, such as linear layer 306*b*, the weights of the backbone layers 304 are frozen. More specifically, loss function 506 calculates a loss between orientation identification 504 and the target orientation identification in car orientation dataset 502 for a particular input. In some aspects, this loss is used to updated the weights of linear layer 306*b*, but no other layer.

Figure 6:
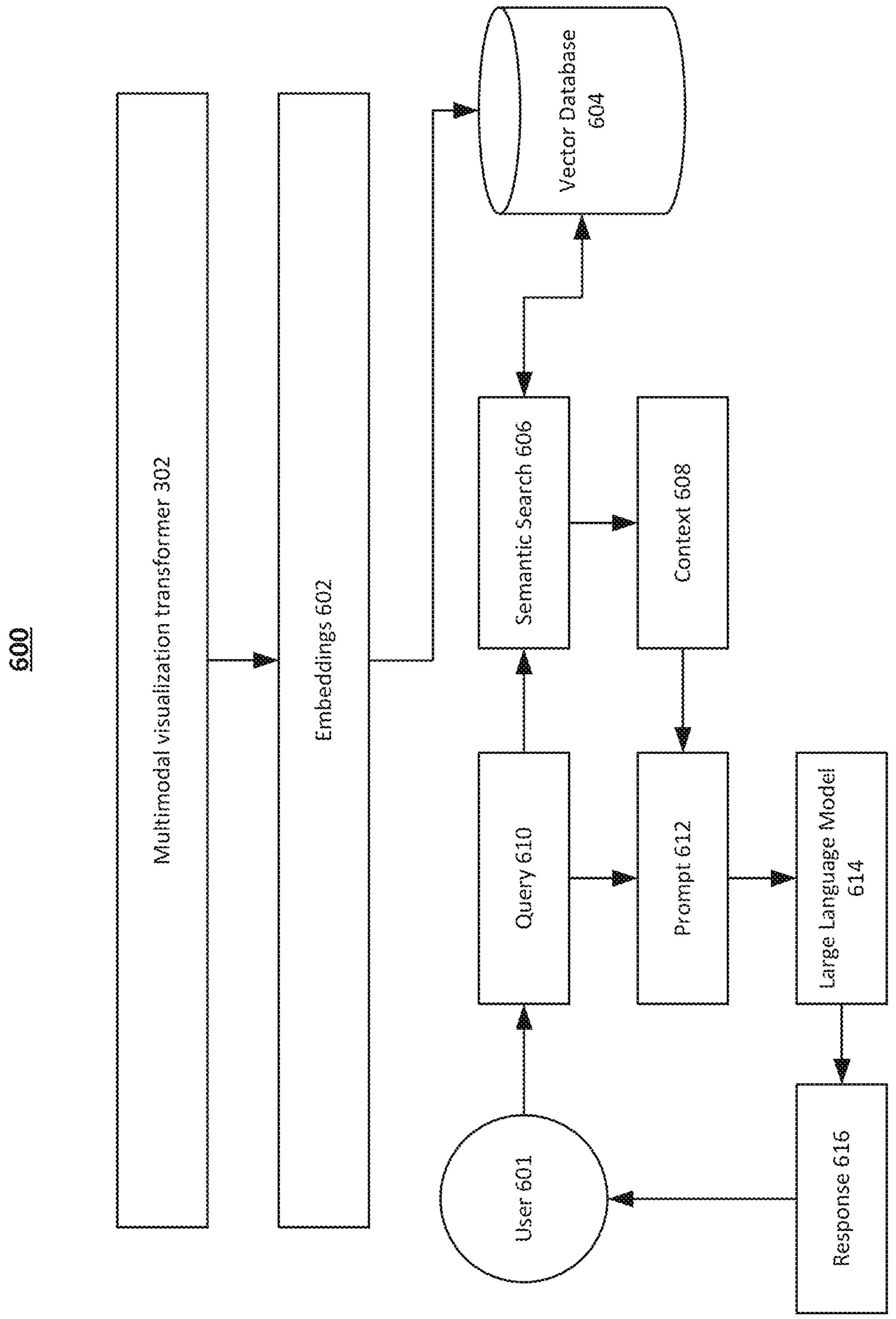
FIG. 6 is a block diagram illustrating the execution of a large language model that generates text comprising requested information about identified vehicles.

FIG. 6 is a block diagram 600 illustrating the execution of a large language model that generates text comprising requested information about identified vehicles. The components shown in diagram 600 may all be part of vehicle module 101. One of the features of user interface 100 is to provide specific responses to user queries. For example, user 601 may input a query 610 via user interface 100. Query 610 may initiate semantic search 606 through vector database 604, which is populated by outputs generated using transformer 302. More specifically, vector database 604 may include embeddings 602 of transformer 302.

Semantic search 606 results in context 608, which provides prompt 612. A large language model 614 receives prompt 612 and generates response 616, which is output on user interface 100 for viewing by user 601.

For instance, user 601 may query, "show me all red cars with bumper damage." Semantic search 606 processes this query through vector database 604, retrieving relevant embeddings 602 that match the criteria. The search ultimately results in context 608, which provides prompt 612. Large language model 614 receives prompt 612 and generates response 616, which is output on user interface 100 for viewing by user 601. The response might include a list of red cars from 2020, complete with images, specifications, and availability status.

Figure 7:
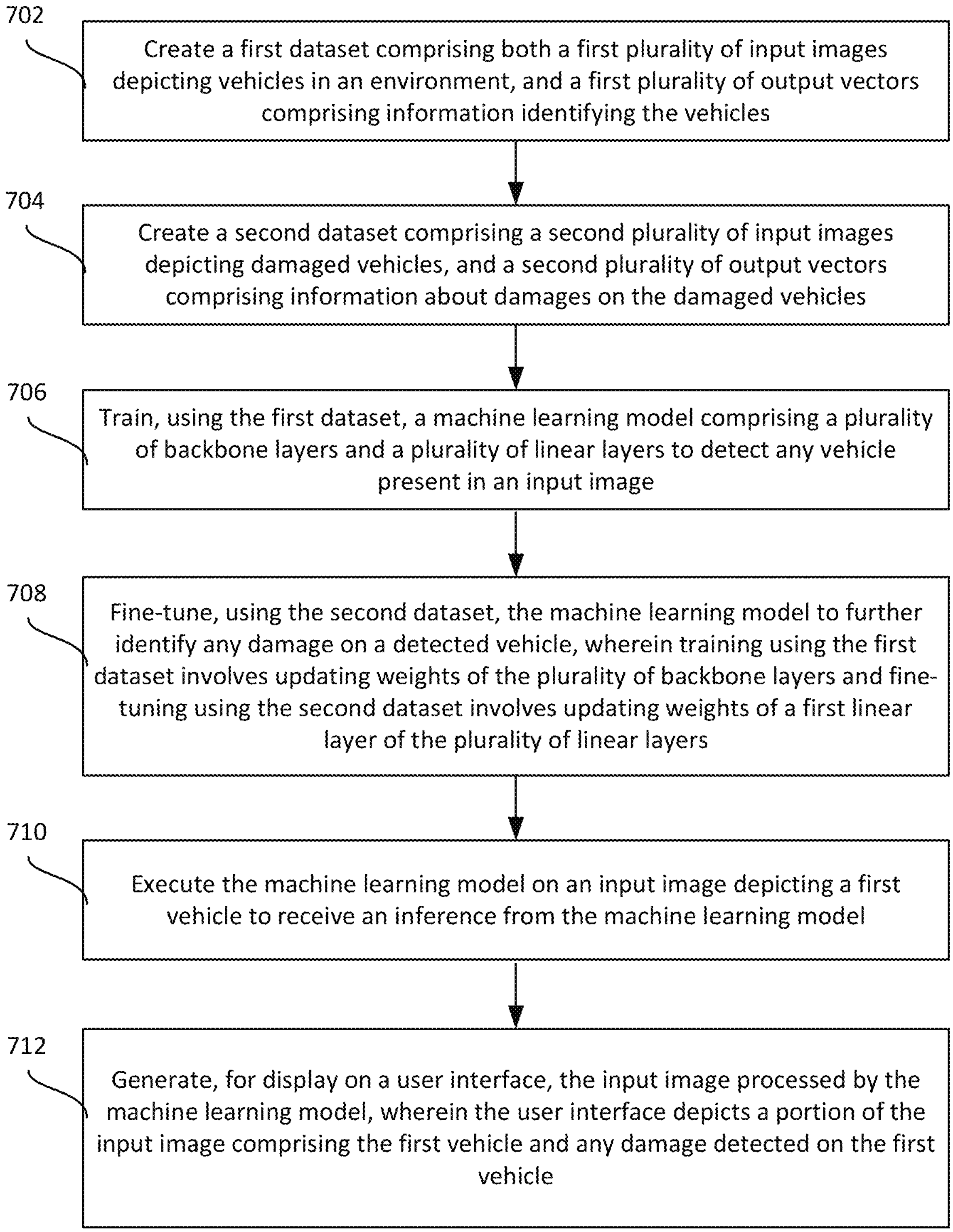
FIG. 7 illustrates a flow diagram of a method for generating information about vehicles in an environment.

FIG. 7 illustrates a flow diagram of method 700 for generating information about vehicles in an environment. At 702, vehicle module 101 creates a first dataset (e.g., processed dataset 206) comprising both a first plurality of input images (e.g., cropped car pictures 222) depicting vehicles in an environment (e.g., a race track, a parking lot, or a city street) and a first plurality of output vectors comprising information identifying the vehicles (e.g., vehicle make and model, license plate numbers).

In some aspects, the information comprised in the first plurality of output vectors further indicates an amount of vehicles in the environment, an order of vehicles, and descriptions of vehicle movement. For example, the first plurality of output vectors may include information from activity information 228 (e.g., the number of cars on the race track, the sequence in which cars are positioned, and the speed and direction of each car).

In some aspects, the information comprised in the first plurality of output vectors further indicates a segmentation map that differentiates zones in the environment where a given vehicle is authorized to move. For example, the first plurality of output vectors may include information from zone information 226 (e.g., designated parking areas in a parking lot, restricted lanes on a highway, or pit stop zones on a race track).

In some aspects, the information comprised in the first plurality of output vectors further indicates livery information (e.g., livery description 224) with visual attributes of a given vehicle (e.g., color patterns, sponsor logos, or unique decals on race cars).

At 704, vehicle module 101 creates a second dataset (e.g., damaged car dataset 402) comprising a second plurality of input images depicting damaged vehicles, and a second plurality of output vectors comprising information about damages on the damaged vehicles. In some aspects, the first dataset is a generalized dataset compared to the second dataset. For example, the first dataset may include a wide variety of vehicle images in different conditions and environments (e.g., cars on a race track, parked cars, or cars in traffic), while the second dataset specifically focuses on images of vehicles that have sustained damage.

At 706, vehicle module 101 trains, using the first dataset, a machine learning model (e.g., transformer 302) comprising a plurality of backbone layers (e.g., layers 304 which may be convolutional layers) and a plurality of linear layers (e.g., layers 306*a*, 306*b*, 306*c* which may be fully connected layers for classification and regression tasks) to detect any vehicle present in an input image and provide a description of the detected vehicle. For example, vehicle module 101 may train the transformer 302 to generate text descriptions 314 (e.g., "red sedan with a sunroof," "blue SUV with roof rack," or "white sports car with racing stripes"). The model can be trained to recognize various attributes of vehicles such as make, model, color, and additional features, providing detailed descriptions based on the input images.

At 708, vehicle module 101 fine-tunes, using the second dataset, the machine learning model to further identify any damage on a detected vehicle. Here, the training using the first dataset involves updating weights of the plurality of backbone layers (e.g., convolutional layers responsible for extracting features such as edges, textures, and shapes from the images) and fine-tuning using the second dataset involves updating weights of a first linear layer of the plurality of linear layers (e.g., the initial fully connected layer responsible for interpreting the extracted features to identify specific types of damage). When training using the first dataset, the weights of the linear layers are frozen (i.e., the parameters of these layers are not updated during training to maintain their initial state). When training using the second dataset, the weights of the backbone layers and, in some aspects, the weights of the linear layers are frozen (i.e., only the weights of the first linear layer are updated to specialize in damage detection). For example, during the fine-tuning process, the model might learn to identify specific damage types such as "front bumper dent," "cracked windshield," or "scratched door panel" by adjusting the weights of the first linear layer based on the second dataset.

At 710, vehicle module 101 executes the machine learning model on an input image depicting a first vehicle to receive an inference from the machine learning model. For example, the model might analyze an image of a car involved in a minor collision and provide an output such as "blue sedan with a dented front bumper and a broken headlight." This inference can include both the identification of the vehicle (e.g., make, model, color) and a detailed description of any detected damage, allowing for a comprehensive understanding of the vehicle's condition.

At 712, vehicle module 101 generates, for display on a user interface (e.g., user interface 100), the input image processed by the machine learning model, wherein the user interface depicts a portion of the input image comprising the first vehicle and any damage detected on the first vehicle. For example, the user interface might show an image of a red sedan with highlighted areas indicating detected damages such as a dent on the front bumper and a cracked windshield. The interface could also provide textual descriptions or annotations next to the highlighted areas, such as "Dent on front bumper" and "Cracked windshield," allowing users to easily identify and understand the extent of the damage.

In some aspects, vehicle module 101 may further create a third dataset comprising a third plurality of input images depicting vehicles at various angles (e.g., side views, front views, rear views, and top-down views of cars), and a third plurality of output vectors indicating specific orientations of the vehicles at various angles (e.g., "front-left 45 degrees," "rear-right 30 degrees," or "top-down 90 degrees"). Vehicle module 101 may then fine-tune, using the third dataset, the machine learning model to further identify an orientation on a detected vehicle, wherein fine-tuning using the third dataset involves updating weights of a second linear layer of the plurality of linear layers. For example, the model might be trained to recognize and label the orientation of a vehicle in an image, such as "front-left view" or "rear-right view," by adjusting the weights of the second linear layer based on the third dataset. This capability can enhance the model's accuracy in identifying vehicle positions and orientations, which is useful for applications like automated parking systems, vehicle tracking, and damage assessment from different angles.

In some aspects, the user interface further indicates a determined orientation (e.g., front, front-right) of the first vehicle in the input image.

In some aspects, vehicle module 101 receives, via the user interface, a user request to view any images that meet one or more criteria (e.g., by making selections in filtering options 102) comprising: a specific type of vehicle (e.g., "sedan," "SUV," "truck"), a vehicle with a particular type of damage (e.g., "dented bumper," "cracked windshield"), vehicles in a specific orientation (e.g., "front view," "rear-left view"). Accordingly, vehicle module 101 selects, from a plurality of processed images, a subset of images (e.g., results 106) that meet the one or more criteria. For example, a user might filter to see all images of "red sedans with front bumper damage" and the system would display relevant images that match these criteria, allowing for efficient and targeted searches.

In some aspects, vehicle module 101 trains, using the first dataset and the second dataset, a large language model to answer user queries received via the user interface, wherein the user queries request portions of information in the first dataset and the second dataset. For example, the large language model could be trained to understand and respond to questions like "How many vehicles have front bumper damage?" or "Show me all images of blue SUVs with side damage," leveraging the detailed information contained in both datasets.

Vehicle module 101 may then receive a user query, and execute the large language model on the user query. Vehicle module 101 may further output, on the user interface, a response to the user query generated by the large language model. For example, the user may make a specific request where all filtering options are provided in a text/speech input (e.g., "show me images of a Chevy car with number 24 on the side"). The system would then process this query, search through the datasets, and display images that match the description, such as a series of images showing a Chevy car with the number 24 prominently displayed on its side, possibly in various conditions and orientations. This functionality enhances user interaction by allowing natural language queries to retrieve specific and relevant information quickly.

Figure 8:
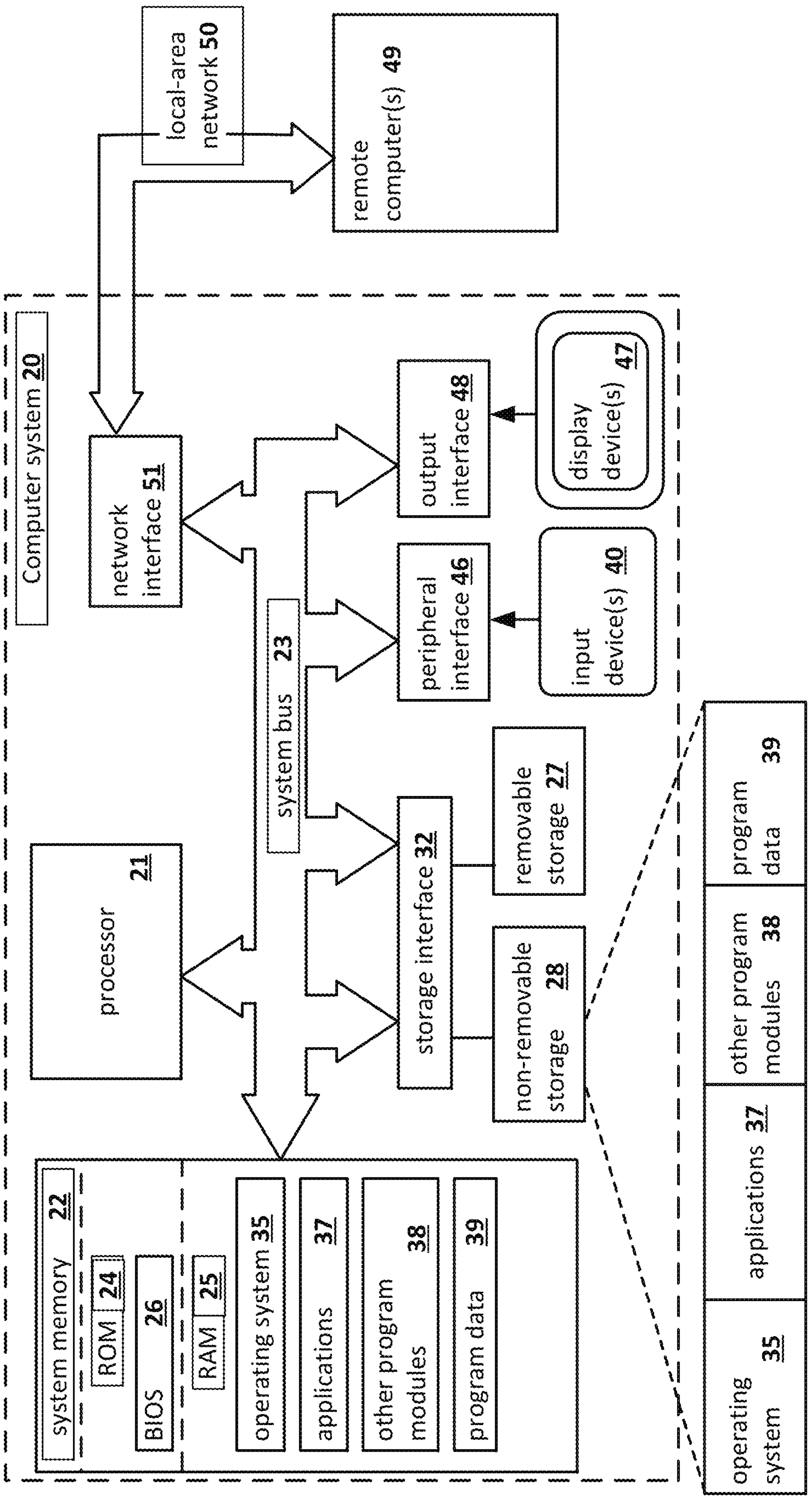
FIG. 8 presents an example of a general-purpose computer system on which aspects of the present disclosure can be implemented.

FIG. 8 is a block diagram illustrating a computer system 20 on which aspects of systems and methods for extracting information about vehicles detected in an image and generating a user interface presenting extracted information pertaining to the vehicles may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, HyperTransport™, InfiniBand™, Serial ATA, 12C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-7 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for extracting information about vehicles detected in an image, the method comprising:
creating a first dataset comprising both a first plurality of input images depicting vehicles in an environment, and a first plurality of output vectors comprising information identifying the vehicles;
creating a second dataset comprising a second plurality of input images depicting damaged vehicles, and a second plurality of output vectors comprising information about damages on the damaged vehicles;
training, using the first dataset, a machine learning model comprising a plurality of backbone layers and a plurality of linear layers to detect any vehicle present in an input image;
fine-tuning, using the second dataset, the machine learning model to further identify any damage on a detected vehicle, wherein training using the first dataset involves updating weights of the plurality of backbone layers and fine-tuning using the second dataset involves updating weights of a first linear layer of the plurality of linear layers;
executing the machine learning model on an input image depicting a first vehicle to receive an inference from the machine learning model; and
generating, for display on a user interface, the input image processed by the machine learning model, wherein the user interface depicts a portion of the input image comprising the first vehicle and any damage detected on the first vehicle.

2. The method of claim 1, further comprising:
creating a third dataset comprising a third plurality of input images depicting vehicles at various angles, and a third plurality of output vectors indicating specific orientations of the vehicles at various angles; and
fine-tuning, using the third dataset, the machine learning model to further identify an orientation on a detected vehicle, wherein fine-tuning using the third dataset involves updating weights of a second linear layer of the plurality of linear layers.

3. The method of claim 2, wherein the user interface further indicates a determined orientation of the first vehicle in the input image.

4. The method of claim 1, further comprising:
receiving, via the user interface, a user request to view any images that meet one or more criteria comprising: a specific type of vehicle, a vehicle with a particular type of damage, vehicles in a specific orientation; and
selecting, from a plurality of processed images, a subset of images that meet the one or more criteria.

5. The method of claim 1, wherein the information comprised in the first plurality of output vectors further indicates an amount of vehicles in the environment, an order of vehicles, and descriptions of vehicle movement.

6. The method of claim 1, wherein the information comprised in the first plurality of output vectors further indicates a segmentation map that differentiates zones in the environment where a given vehicle is authorized to move.

7. The method of claim 1, wherein the information comprised in the first plurality of output vectors further indicates a livery description that lists visual attributes of a given vehicle.

8. The method of claim 1, wherein the first dataset is a generalized dataset compared to the second dataset.

9. The method of claim 1, further comprising:
training, using the first dataset and the second dataset, a large language model to answer user queries received via the user interface, wherein the user queries request portions of information in the first dataset and the second dataset;
receiving a user query;
executing the large language model on the user query; and
outputting, on the user interface, a response to the user query generated by the large language model.

10. A system for extracting information about vehicles detected in an image, comprising:
at least one memory;
at least one hardware processor coupled with the at least one memory and configured, individually or in combination, to:
create a first dataset comprising both a first plurality of input images depicting vehicles in an environment, and a first plurality of output vectors comprising information identifying the vehicles;
create a second dataset comprising a second plurality of input images depicting damaged vehicles, and a second plurality of output vectors comprising information about damages on the damaged vehicles;
train, using the first dataset, a machine learning model comprising a plurality of backbone layers and a plurality of linear layers to detect any vehicle present in an input image;
fine-tune, using the second dataset, the machine learning model to further identify any damage on a detected vehicle, wherein training using the first dataset involves updating weights of the plurality of backbone layers and fine-tuning using the second dataset involves updating weights of a first linear layer of the plurality of linear layers;
execute the machine learning model on an input image depicting a first vehicle to receive an inference from the machine learning model; and
generate, for display on a user interface, the input image processed by the machine learning model, wherein the user interface depicts a portion of the input image comprising the first vehicle and any damage detected on the first vehicle.

11. The system of claim 10, wherein the at least one hardware processor is further configured to:
create a third dataset comprising a third plurality of input images depicting vehicles at various angles, and a third plurality of output vectors indicating specific orientations of the vehicles at various angles; and
fine-tune, using the third dataset, the machine learning model to further identify an orientation on a detected vehicle, wherein fine-tuning using the third dataset involves updating weights of a second linear layer of the plurality of linear layers.

12. The system of claim 11, wherein the user interface further indicates a determined orientation of the first vehicle in the input image.

13. The system of claim 10, wherein the at least one hardware processor is further configured to:
receive, via the user interface, a user request to view any images that meet one or more criteria comprising: a specific type of vehicle, a vehicle with a particular type of damage, vehicles in a specific orientation; and
select, from a plurality of processed images, a subset of images that meet the one or more criteria.

14. The system of claim 10, wherein the information comprised in the first plurality of output vectors further indicates an amount of vehicles in the environment, an order of vehicles, and descriptions of vehicle movement.

15. The system of claim 10, wherein the information comprised in the first plurality of output vectors further indicates a segmentation map that differentiates zones in the environment where a given vehicle is authorized to move.

16. The system of claim 10, wherein the information comprised in the first plurality of output vectors further indicates a livery description that lists visual attributes of a given vehicle.

17. The system of claim 10, wherein the first dataset is a generalized dataset compared to the second dataset.

18. The system of claim 10, wherein the at least one hardware processor is further configured to:

train, using the first dataset and the second dataset, a large language model to answer user queries received via the user interface, wherein the user queries request portions of information in the first dataset and the second dataset;

receive a user query;

execute the large language model on the user query; and output, on the user interface, a response to the user query generated by the large language model.

19. A non-transitory computer readable medium storing thereon computer executable instructions for extracting information about vehicles detected in an image, including instructions for:

creating a first dataset comprising both a first plurality of input images depicting vehicles in an environment, and a first plurality of output vectors comprising information identifying the vehicles;

creating a second dataset comprising a second plurality of input images depicting damaged vehicles, and a second plurality of output vectors comprising information about damages on the damaged vehicles;

training, using the first dataset, a machine learning model comprising a plurality of backbone layers and a plurality of linear layers to detect any vehicle present in an input image;

fine-tuning, using the second dataset, the machine learning model to further identify any damage on a detected vehicle, wherein training using the first dataset involves updating weights of the plurality of backbone layers and fine-tuning using the second dataset involves updating weights of a first linear layer of the plurality of linear layers;

executing the machine learning model on an input image depicting a first vehicle to receive an inference from the machine learning model; and generating, for display on a user interface, the input image processed by the machine learning model, wherein the user interface depicts a portion of the input image comprising the first vehicle and any damage detected on the first vehicle.

* * * * *